United States Patent [19]
Bard et al.

[11] 4,365,010
[45] Dec. 21, 1982

[54] PHOTOELECTROCHROMIC GENERATOR AND DISPLAY DEVICE

[75] Inventors: Allen J. Bard; Fu-Ren F. Fan, both of Austin, Tex.; Benjamin Reichman, Birmingham, Mich.

[73] Assignee: The United States of America as represented by the Secretary of the Navy, Washington, D.C.

[21] Appl. No.: 230,850

[22] Filed: Feb. 2, 1981

[51] Int. Cl.³ .......................... H01M 6/36; G02F 1/01
[52] U.S. Cl. ...................................... 429/111; 350/357
[58] Field of Search ......................... 429/111; 350/357

[56] References Cited

U.S. PATENT DOCUMENTS 3,950,077  4/1976  Jasinski ........................... 350/357
4,242,423  12/1980  Hada .................................. 429/111

OTHER PUBLICATIONS

J. Bruinink et al, "The Voltammetric Behavior of Some Viologens at SuO₂ Electrodes", *J. Electrochem. Soc.*, vol. 125, pp. 1397-1401 (1978).
C. J. Shoot et al, "New Electrochemical Memory Display", *Appl. Phys. Lett.*, vol. 23, pp. 64-65 (1973).
M. Yamana, "New Photoelectrochemical Display", *Appl. Phys. Lett.*, vol. 29, pp. 570-571 (1976).
H. T. von Dam et al, "Electrochemically Generated Colored Films of Insoluble Viologen Radical Compounds", *J. Electrochem. Soc.*, vol. 121, pp. 1555-1558 (1974).
C. Daul et al, "Transient Processes in Photogalvanic Cells-Part III, the Alternating Current Photogalvanic Cell", *J. Electroanal. Chem.*, vol. 125, pp. 307-313 (1981).
T. Inoue et al, "Photoelectrochemical Imaging Processes Using Semiconductor Electrodes", *Chem. Lett.*, pp. 1197-1200 (1978).
T. Inoue et al, "Photoelectrochemical Characteristics of Photo-Electrochemical Imaging System . . . ", *J. Electrochem. Soc.*, vol. 127, pp. 1582-1588 (1980).
T. Inoue et al, "A New Method of Reproducible Photoelectrochemical Imaging Employing a Semiconductor Photoelectrode", *Japan J. Appl. Phys.*, vol. 18, pp. 2177-2178 (1979).
B. Reichman et al, "Semiconductor Electrodes-XXV, The p-GaAs/Heptyl Viologen System Photoelectrochemical Cells & Photoelectrochromic Displays", *J. Electro Chem. Soc.*, vol. 127, pp. 333-338 (1980).
Chem. Abstracts, vol. 92, 205961k (1980).

*Primary Examiner*—Aaron Weisstuch
*Attorney, Agent, or Firm*—Robert F. Beers; Frederick A. Wein

[57] ABSTRACT

A photoelectrochromic display device having a semiconductor electrode, and a counterelectrode made of a selected metallic material is presented. The electrode and counterelectrode are immersed in an aqueous solution containing heptyl viologen. The device is usable as a display device, as a storage battery, and as an alternating current photoelectric generator. As a display device, the cell requires only two leads rather than multiple leads and complicated electrical addressing and decoding required for most multi-character displays.

6 Claims, 1 Drawing Figure

4,365,010

PHOTOELECTROCHROMIC GENERATOR AND DISPLAY DEVICE

The present invention relates to display devices, and more particularly, to photoelectrochromic devices having a semiconductor electrode.

SUMMARY OF THE INVENTION

The present invention relates to photoelectrochromic display devices having a semiconductor electrode. The present device comprises a semiconductor electrode made of p-GaAs material, and a counterelectrode made of materials selected from a group consisting of Cu, Cu oxide, $Nb_2O_5$, $H_xNb_2O_5$, Ni, or Ni-oxide, with both electrodes being immersed in an aqueous solution containing 1,1'-diheptyl-4,4'-bipyridyl (heptyl viologen, $HV^{2+}$) bromide. The devices are usable as a display device, as a storage battery, and as an alternating current photoelectric generator. As a display device, the cell requires only two leads rather than the multiple leads and the complicated electrical addressing and decoding required for most multi-character displays.

OBJECTS OF THE INVENTION

Accordingly, it is an object of the invention to provide a photoelectrochromic display device having a semiconductor electrode.

It is another object of the present invention to provide a photoelectrochromic display device having one semiconductor electrode, and one counterelectrode made of material selected from a group consisting of Cu, Cu oxide, $Nb_2O_5$, $H_xNb_2O_5$, Ni, or Ni oxide, with both electrodes immersed in an aqueous solution containing 1,1'-diheptyl (heptyl viologen, $HV^{2+}$) bromide.

Yet another object of the present invention is to provide a photoelectrochromic device usable as an alternating current generator in response to chopped illumination.

Still another object of the present invention is to provide a photoelectrochromic device usable as a storage battery which is chargeable by illumination.

Further objects and advantages of the present invention will become apparent as the following description proceeds and the features of novelty characterizing the invention will be pointed out with particularity in the claims annexed to and forming a part of this specification.

DESCRIPTION OF THE DRAWING

For a better understanding of the present invention reference may be had to the accompanying drawing wherein.

DETAILED DESCRIPTION OF THE PREFERRED EMBODIMENT

Figure 1:
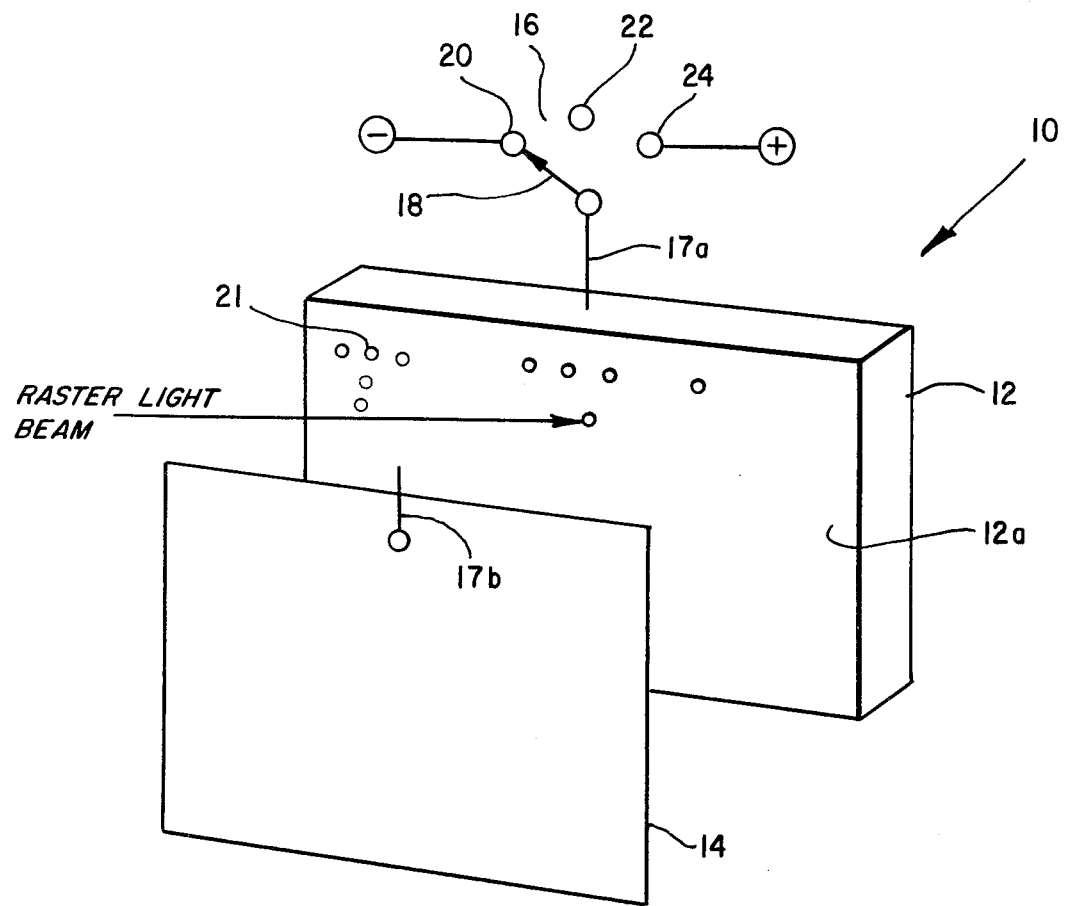
FIG. 1 is a diagrammatic representation of a photoelectrochromic device of the present invention.

Referring now to the drawing, there is shown in FIG. 1 a diagrammatic representation of a photoelectochromic device or photoelectric cell, generally designated 10, usable as a display device. In the exemplary embodiment, a planar electrode 12 comprises p-type GaAs semiconductor material and a planar counterelectrode 14 spaced apart from and parallel to electrode 12, comprises a selected metallic material as disclosed hereinafter. The electrode 12 and counterelectrode 14 are immersed in an aqueous solution of heptyl viologen. Illumination of the electrode 12 by a beam of light results in a plating onto the electrode 12 material and the generation of a polarized D C potential between the electrode 12 and counterelectrode 14. Removal of the illumination results in an unplating of the semiconductor material with a resulting short-circuit current flow and reverse polarized potential. The plating can define an image provided by an illumination raster light beam and the unplating results in the erasure of the image. The present device is usable as a storage battery, as an alternating current photoelectric generator, and as a photoelectrochromic display addressable by two electrical leads and having a light beam produced image on the electrode surface.

More particularly, the electrode 12 and the counterelectrode 14 are immersed in an aqueous solution containing 1.1'-diheptyl-4,4'-bipyridyl (heptyl viologen, $HV^{2+}$) bromide. The reduction of $HV^{2+}$ bromide at the semiconductor electrode yields a precipitate of the violet radical cation salt defined by

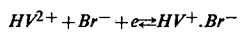
$$HV^{2+} + Br^- + e \rightleftharpoons HV^+ \cdot Br^-$$

The formation of such a precipitate by photoreduction at a p-type semiconductor would allow low capacity energy storage via a solid material as occurs in secondary batteries. It has been found that such a photoreduction occurs for p-GaAs at potentials 400 mV less negative than that observed at a platinium electrode and that a dark oxidation of the HVBr precipitate occurs. Moreover, the p-GaAs electrode is stable both in the dark and under illumination in the $HV^{2+}$ solution so that the cell, using suitable counterelectrodes, will show a periodic plus and minus polarity electrical output under periodic chopped illumination. Additionally, a display based upon the dark precipitate of HVBr on a semiconductor electrode simultaneously addressed by a light beam and an electrical signal, as shown in FIG. 1, is disclosed.

In the exemplary embodiment, the electrode 12 comprises single crystal p-GaAs, Zn-doped, with an acceptor concentration of $3\times10^{18} cm^{-3}$. The surface (face 111) is polished with 0.5 micron alumina powder and then etched for 10–15 seconds in a solution containing $H_2SO_4:H_2O:30\% H_2O_2$ in concentration ratio of 3:1:1. The electrochemical cell 10 is provided with Pyrex TM windows for the passage of light as the viologen radical cations are very sensitive to oxygen.

Blanket illumination of the p-GaAs electrode, e.g., provided by a high powered xenon lamp, causes a large cathodic current to flow simultaneously with the appearance of the precipitation of the violet HVBr on the electrode surface with an externally applied scan voltage of 100 mV per second. On reversing the scan direction, an anodic current is generated and the violet precipitate on the semiconductor surface will disappear, thus providing cyclic write and erase capability, as will be further discussed hereinafter.

Upon illumination of the electrode 12 by a narrow beam of a He-Ne laser, the violet image will appear on the electrode surface at exactly the location and size of the laser beam spot. Good coloration is observed on the electrode surface during the write cycle within 0.5 seconds after illumination of the electrode with the electrode held at a constant potential of −0.35 volts with respect to the counterelectrode.

The photoreduction current on the p-GaAs is limited by the rate of diffusion of the $HV^{2+}$ onto the electrode surface. Thus, at more negative potentials, the maximum current is substantially independent of the intensity of illumination.

The photoreduction of $HV^{2+}$ occurs on p-GaAs at approximately the same potential as the oxidation of the precipitate on p-GaAs in the dark occurs, thus providing an image storage cell having a p-GaAs electrode and a chemically reversible counterelectrode 14 having a redox potential between the potential for the photoreduction of $HV^{2+}$ on p-GaAs and the potential for oxidation of HVBr in the dark. For such a cell, when light irradiates the p-GaAs, the electrode 12 is the cathode of the cell and the HVBr precipitates onto the electrode 12. The HVBr precipitate on the electrode 12 is then oxidized in the dark back to the original $HV^{2+}$ when the counterelectrode serves as the cathode of the cell.

For this purpose, it was found that six materials have redox potentials suitable for use in the cell, i.e. Cu/Cu-oxide, $H_xNb_2O_5/Nb_2O_5$, and Ni/Ni-oxide.

In the photocharged condition, the HVBr will remain on the electrode surface and the open-circuit voltage is stable for at least two hours. The maximum open-circuit voltage is achieved with Cu counterelectrodes, i.e. 0.4 volts.

When the cells are short circuited while illuminated, current flows in the external circuit while precipitation of the purple HVBr on the surface of the p-GaAs electrode 12 occurs. This current reaches a peak current density of 2.4 $mA/cm^2$ of electrode area for a Cu counterelectrode when illuminated by a He-Ne laser. However, this current decays substantially to zero in about 10 seconds because a thick opaque film of HVBr builds up on the electrode 12 surface and the $HV^{2+}$ concentration is depleted near the electrode surface. Thus, the cell is a small capacity storage battery. The precipitate of HVBr can be stored on the p-GaAs electrode and then oxidized in the dark to yield a current from the cell in the opposite direction to that generated under illumination. In this mode, the maximum charge in the form of HVBr which can precipitate on the p-GaAs is about 10 $mC/cm^2$.

Alternately, the cell can be an AC generator under periodic illumination. In this mode of operation, the cell performance is very stable with all counterelectrode materials and little or no deterioration or decrease in output current after days of continuous operation. As an AC generator, the output potential abruptly switches polarity from a negative potential when illuminated to a positive potential when dark. The short circuit current is linearly dependent upon light intensity. For Cu counterelectrodes, saturation current is reached at approximately 2.5 $mA/cm^2$. No saturation of the short circuit current occurs with a Ni counterelectrode even at the highest light intensities used while with $Nb_2O_5$ a linear dependence was observed only at very low light levels.

The maximum quantum efficiencies for the cell with the different counterelectrode materials was calculated from the slopes of the linear portions of the curves of short circuit current vs light intensity using a He-Ne laser as follows: Cu, 20%, Ni, 10%, and $Nb_2O_5$, 2%.

Storage capacity of the storage cells can be increased if an appropriate film can be found which, as well as being an electrical conductor, is also transparent to the wavelength absorbed by the semiconductor electrode, i.e. sensitive to light wavelengths below 885 nm, such as provided from a 450 watt xenon lamp.

Referring again to FIG. 1, the light beam produces a raster on the electrode 12 surface and would trace out or write an image on the surface of the electrode 12.

The potential of the electrode 12 with respect to the counterelectrode determines the mode of operation of the display cell. As shown in FIG. 1, a switch 16 is provided for connecting the electrode to a predetermined bias potential with respect to the counterelectrode respectively by leads 17a, b. With the rotor 18 of switch 16 connected to terminal 20, a negative potential is applied to the electrode 12 and the image 21 is formed on the electrode surface 12a by the raster beam in a manner explained hereinabove. Once image 21 is formed, rotor 18 of the switch 16 is then switched to terminal 22 which is an open circuit such that image 21 will be maintained for a period of time. Erasure is obtained by switching rotor 18 to terminal 24 where positive potential is applied. Thus only two leads 17a,b need be provided to the cell for application of the bias potential rather than multiple leads and complicated electrical addressing and decoding required for most multicharacter displays.

Thus there is disclosed a photoelectrochromic cell usable as a display device, as a storage battery, and as an alternating current photoelectric generator. The display device is addressable by only two electrical leads with a light beam producing a raster and image on the electrode surface.

While there has been illustrated and described what is at present considered to be a preferred embodiment of the present invention, it will be appreciated that numerous changes and modifications are likely to occur to those skilled in the art and it is intended that the appended claims cover all those changes and modifications which fall within the true spirit and scope of the present invention.

What is claimed as new and desired to be secured by Letters of Patent is:

1. A device usable as a photoelectric cell or as a rechargeable storage battery, comprising:
   a semiconductor first electrode comprising P-GaAs provided with a first output means connectable to an external circuit,
   a metallic second electrode provided with a second output means connectable to the external circuit, and
   an aqueous solution comprising heptyl viologen,
   the first and second electrodes being immersed in the aqueous solution and illuminatable by light radiation for generating an output at the output means.

2. An alternating current photoelectric generator comprising:
   a semiconductor first electrode comprising P-GaAs provided with a first output means connectable to an external circuit,
   a metallic second electrode provided with a second output means connectable to the external circuit, and
   an aqueous solution comprising heptyl viologen,
   the first and second electrodes being immersed in the aqueous solution and means for illuminating said first electrode by a periodic chopped light illumination source for generating an AC output at the output means for providing AC power to the external circuit.

3. A photoelectric display device comprising:
   a semiconductor first electrode comprising P-GaAs provided with a first output means connectable to an external circuit, a metallic second electrode provided with a second output means connectable to the external circuit, and an aqueous solution comprising heptyl viologen, the first and second electrodes being immersed in the aqueous solution and connectable to an external bias potential, and means for illuminating the first electrode with a raster light beam for forming a display image on the first electrode.

4. The display device of claim 3 including external bias potential means and wherein the display image is preservable by disconnecting the first output means from the external bias potential means.

5. The display device of claim 3 including external bias potential means and wherein the display image is erasable by reversing the polarity of the external bias potential means applied to the respective output means.

6. The devices of claims 1, 2, 3, 4 or 5 wherein the second electrode comprises a metallic material selected from the group consisting of Cu, Cu oxide, $Nb_2O_5$, $H_xNb_2O_5$, Ni, or Ni oxide.

* * * * *